United States Patent [19]

Yokota

[11] Patent Number: 5,266,247
[45] Date of Patent: Nov. 30, 1993

[54] MOLDING CYCLE CONTROL METHOD OF AN INJECTION MOLDER

[75] Inventor: Akira Yokota, Hirakata, Japan
[73] Assignee: Komatsu Ltd.
[21] Appl. No.: 809,557
[22] PCT Filed: May 15, 1991
[86] PCT No.: PCT/JP91/00637
§ 371 Date: Jan. 23, 1992
§ 102(e) Date: Jan. 23, 1992
[87] PCT Pub. No.: WO91/17879
PCT Pub. Date: Nov. 28, 1991

[30] Foreign Application Priority Data

May 24, 1990 [JP] Japan .................. 2-134763

[51] Int. Cl.$^5$ .................. B29C 45/50; B29C 45/77
[52] U.S. Cl. .................. 264/40.4; 264/328.1; 425/145; 425/562
[58] Field of Search .................. 264/40.1, 40.4, 40.5, 264/328.1; 425/135, 145, 146–150, 557, 559, 562

[56] References Cited

U.S. PATENT DOCUMENTS

| | | | |
|---|---|---|---|
| 3,902,665 | 9/1975 | Hendry | 425/467 |
| 4,846,651 | 7/1989 | Matsuda | 425/145 |

FOREIGN PATENT DOCUMENTS

| | | |
|---|---|---|
| 0464225 | 1/1992 | European Pat. Off. . |
| 61-241113 | 10/1986 | Japan . |
| 62-227617 | 10/1987 | Japan . |
| 63-150632 | 6/1988 | Japan . |
| 1-22526 | 1/1989 | Japan . |
| 2-98421 | 4/1990 | Japan . |
| WO91/13743 | 9/1991 | PCT Int'l Appl. . |
| WO91/13745 | 9/1991 | PCT Int'l Appl. . |

*Primary Examiner*—Jill L. Heitbrink
*Attorney, Agent, or Firm*—Armstrong, Teasdale, Schlafly & Davis

[57] ABSTRACT

A molding cycle control method of an injection molder includes a flow passage opening and closing mechanism which prevents a flow of a plasticized synthetic resin to be injected, aiming at shortening the time required for each molding cycle and the stability of weight value of molded products. The above-mentioned control method includes the flow passage opening and closing mechanism being closed under the state that the plasticized synthetic resin is injected and filled into a cavity of a mold and is applied with dwelling pressure. Thus, a dwelling process is conducted by the residual dwelling pressure at the mold side and simultaneously a measuring process for a next molding cycle is carried out at the screw side, thereby enabling the time required for each molding cycle to be shortened. Further, with the provision of the flow passage opening and closing mechanism and the check valve at the screw, a definite the predetermined value of resin pressure of the plasticized synthetic resin placed in the cylinder immediately before the injection and during the dwelling can be obtained. Furthermore, since a weight value of a molded product can be obtained through an operation, the injection molder can be controlled to keep constant the weight value of molded products constant.

10 Claims, 3 Drawing Sheets

MOLDING CYCLE CONTROL METHOD OF AN INJECTION MOLDER

FIELD OF THE INVENTION

The invention relates to a molding cycle control method of an injection molder comprising a flow passage opening and closing mechanism which is provided between the inside for a cylinder in the injection molder and a cavity of a mold to prevent a flow for plasticized synthetic resin, between the inside of the cylinder and the cavity, wherein a time required for each molding cycle is shortened and the weight of molded products can be kept constant.

BACKGROUND OF THE INVENTION

Injection molding of plasticized synthetic resin, conducted by the use of an injection molder has a problem in that it is difficult to keep the quality of molded products constant by making up the shrinkage of the plasticized synthetic resin in cooling and setting in the cavity of the mold. To solve the problem, various control methods for the injection process have been proposed.

The art disclosed in Japanese Examined Patent Publication No. Hei. 1-33331 (1989) is an example of an attempted solution to the above-mentioned problem, wherein a screw or a plunger moved forward at a high speed in the material filling process is slowed during the dwelling process to apply dwelling pressure to the plasticized synthetic resin placed inside the cavity, then, the screw or the plunger is locked in movement and held in place until the plasticized synthetic resin inside the gate of the mold is cooled and solidified(gate-sealed) to prevent further of the plasticized synthetic resin between the inside of cylinder and the cavity.

However, the gate-sealing is a function occurring inside the mold, so that it is quite difficult to detect precisely when gate sealing occurs. Furthermore, the time when the gate-sealing occurs varies depending on subtle changes of temperatures of the mold and the plasticized synthetic resin, so that the time the screw or the plunger is locked must be set excessively long to ensure and completion of the gate sealing. Also, locking of the screw or the plunger needs a feed-back control device, resulting in requiring an expensive injection molder. Hence, it further leads to a problem of a low productivity due to a longer locking time and a high cost of production due to the use of a complicated control device.

Also, to compensate for the shrinkage of the plasticized synthetic resin cooled and set in the cavity, the conventional control method as above-mentioned supplies a corresponding volumetric amount of material to the shrinkage from the molded product itself by locking the screw or the plunger until the gate is sealed in the dwelling process to prevent a flow of the plasticized synthetic resin in the gate so as to release the pressure of the resin which has been compressed by the filling operation. By this method, the shrinkage can be made up and a molded product of a fixed volume corresponding to an internal volume of the cavity can be provided. But, as long as the plasticized synthetic resin has a compressibility, its density changes depending on the pressure and temperatures, so that it is hard to keep a constant weight of a molded products.

The present invention has been designed to overcome the above-mentioned problems. An object of the invention is to provide a molding cycle control method of an injection molder which method can shorten the time required for each molding cycle without using a complicated device yet keep the weight of the molded products constant.

DISCLOSURE OF THE INVENTION

The molding cycle control method for an injection molder according to the present invention is an injection molding cycle control method for an injection molder comprising a flow passage opening and closing mechanism which is provided between the inside of a cylinder in the injection molder and a cavity of a mold which can block a flow of a plasticized synthetic resin between the inside of the cylinder and the cavity, the molding cycle control method, basically, being characterized as comprising the following steps to achieve the above-mentioned object:

(a) a pre-injection pressing process wherein while the flow passage opening and closing mechanism is closed and the plasticized synthetic resin is prevented from flowing after the synthetic resin has been plasticized and measured, a predetermined pushing force is applied to a screw to set the resin pressure in the cylinder to a predetermined value, (b) a filling and dwelling process comprising a filling process wherein while the flow passage opening and closing mechanism is open to allow the plasticized synthetic resin to flow, the screw is moved forward to inject and fill plasticized synthetic resin into a cavity of a mold, and a dwelling process wherein a predetermined pushing force is applied to the screw in continuation to the filling process, the filling and dwelling process being conducted to fill a predetermined amount of plasticized synthetic resin into the cavity, (c) a measuring process wherein while the flow passage opening and closing mechanism is closed to prevent a flow of plasticized synthetic resin, the screw is rotated and moved backward to measure a predetermined amount of plasticized synthetic resin for a next molding cycle, and (d) a suck-back process wherein while the flow passage opening and closing mechanism is open to allow a flow of plasticized synthetic resin, the screw is moved backward, so that the pressure of plasticized synthetic resin placed between a gate of the mold and a front end of the screw at its forward movement side is reduced.

It is preferable that a check valve be provided at the screw which closes during the pre-injection pressing process to prevent a flow of the plasticized synthetic resin between the flow passage opening and closing mechanism and the check valve in the direction of the backward movement of the screw.

Also, in the filling and dwelling process, the predetermined amount of the plasticized synthetic resin to be filled in the cavity may be detected from the screw's specific positional values or the plasticized synthetic resin pressure values placed in the cylinder or in the cavity, or also from a predetermined travel distance of the screw corresponding to its value, respectively, from a point where the screw is positioned immediately before the injection operation. Furthermore, the predetermined amount of the plasticized synthetic resin may be represented by the following formula with a weight value G as follows.

$$G = (1/V_I - 1/V_H) \times V + A \times X/V_H \qquad (1)$$

wherein:

$V_f$: is a specific volume value of the plasticized synthetic resin on the forward movement side of the front end of the screw in the cylinder immediately before the injection operation;

$V_H$: is a specific volume value of the plasticized synthetic resin placed on the forward movement side of the front end of the screw in the cylinder during the dwelling operation;

V: is a volume value of the plasticized synthetic resin on the forward movement side of the front end of the screw in the cylinder immediately before the injection process;

A: is the internal sectional area of the cylinder;

X: is the travel distance of the screw from its position immediately before the injection to its position during the dwelling operation.

It is preferable that during the above-mentioned dwelling process the flow passage opening and closing mechanism is closed while a predetermined pushing force is being applied to the screw.

Also, it is preferable that the suck-back process is conducted while the plasticized synthetic resin placed in the gate of the mold is solidified and the flow of the plasticized synthetic resin in the gate is blocked. The suck-back process may be carried out at any staged during the measuring process or after the completion thereof.

Hence, according to the molding cycle control method of the injection molder of the present invention, the plasticized synthetic resin in the mold and the plasticized synthetic resin in the screw do not affect each other when the flow passage opening and closing mechanism is closed, so that the separate processes may be conducted simultaneously. For example, when the flow passage opening and closing mechanism is closed during the dwelling process while a predetermined pushing force is applied to the screw for generating dwelling pressure for compensating for the shrinkage of the cooled plasticized synthetic resin, a residual dwelling pressure is created on the mold side of the mechanism where dwelling is then continued while simultaneously, measuring for a next molding cycle can be immediately conducted on the screw side of the mechanism, thereby shortening the time for each molding cycle.

Further, in the pre-injection pressing process, the flow passage opening and closing mechanism as well as the check valve provided at the screw are closed and, the plasticized synthetic resin in the cylinder does not flow back, so that the pressure value of the plasticized synthetic resin can have a definite predetermined value immediately before the injection operation. Also, the resin pressure value of the resin during dwelling process can be set to a definite predetermined value. Hence, the positional value of the screw, the plasticized synthetic resin pressures in the cylinder or in the cavity, or the screw's predetermined travel distance from its position where the screw is positioned immediately before the injection may be detected to obtain a predetermined amount of the plasticized synthetic resin to be injected and filled in the cavity. Also, by applying the aforesaid formula (1), weight value of the plasticized synthetic resin to be injected and filled in the cavity can be obtained to control the injection molder to provide molded products of a constant weight.

BRIEF DESCRIPTION OF THE DRAWINGS

FIG. 1 is a longitudinal sectional schematic diagram of the entirety of the injection molder.

FIG. 2 is an enlarged, partial longitudinal sectional view of the injection molder shown in FIG. 1.

FIG. 3 is a time chart of a molding cycle; and

FIG. 4 is longitudinal sectional views schematically showing operational states of the screw when the weight value of injected and filled plasticized synthetic resin is obtained.

DETAILED DESCRIPTION OF THE PREFERRED EMBODIMENTS

Next, a concrete embodiment of the molding cycle control method of the injection molder according to the present invention will be explained with reference to the accompanied drawings.

Figure 1:
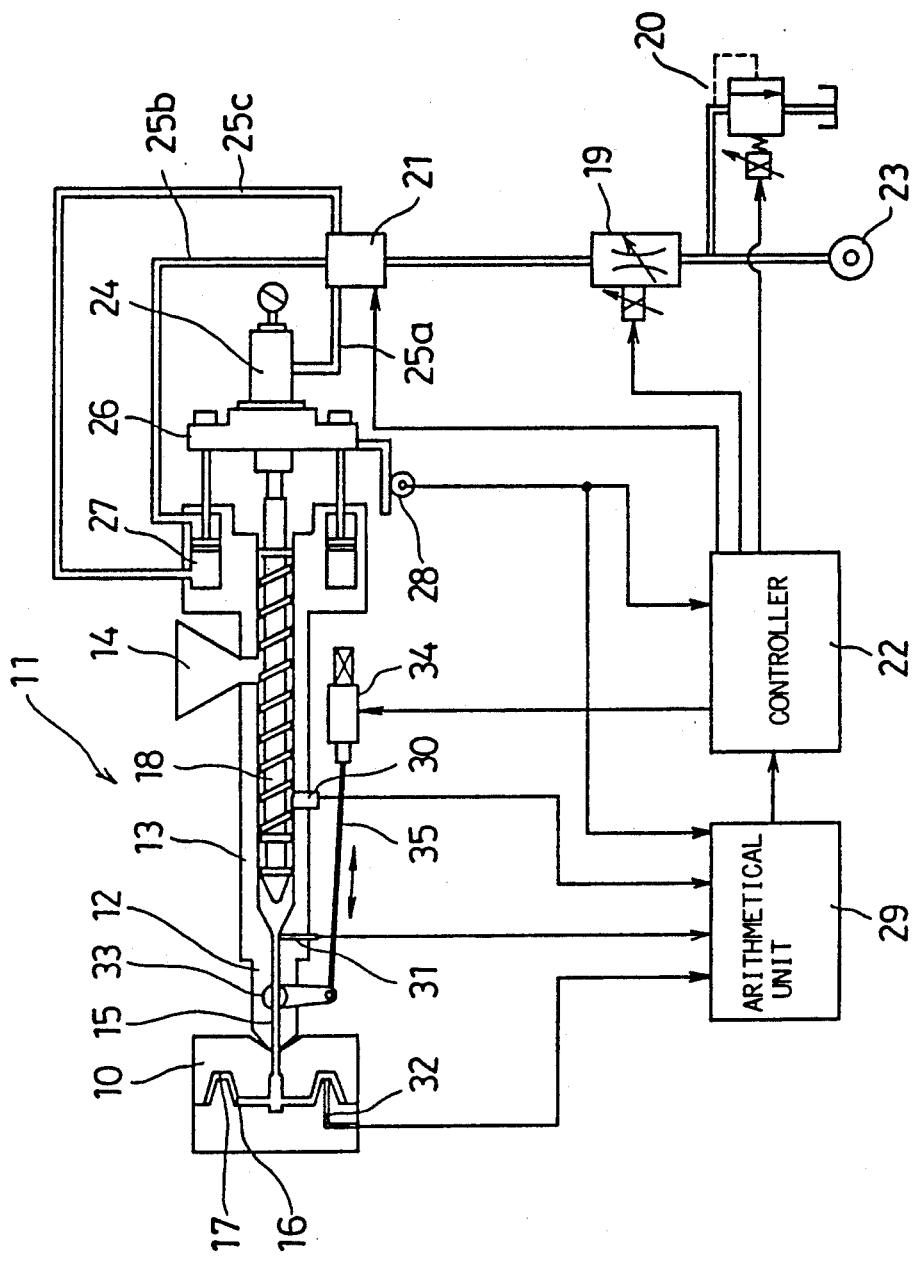
FIGS. 1 through 4 are explanatory drawings showing preferable examples of the molding cycle control method of the injection molder according to the present invention.

FIG. 1 shows a profile o the injection molder, wherein an injection molder 11 is connected to a mold 10 for preparing a molded product through a nozzle part 12. In a cylinder 13 of the injection molder 11 is mounted a screw 18 which melts and kneads resin pellets of the plastifiable synthetic resin material fed from a material hopper 14, and measures the melted and plasticized resin to inject and fill it into a cavity 17 of the mold 10 through a flow passage 15 bored in the nozzle part 12 and a gate 16 of the mold 10. Rotation of the screw 18 for melting and kneading the material resin pellets is controlled by operating an electromagnetic flow valve 19, an electromagnetic pressure valve 20 and a switch valve 21 through a controller 22 to supply and discharge pressure oil from a pressure oil source 23 to a screw rotating motor 24 through a piping 25a. The screw 18 and the screw rotating motor 24 are mounted on a base 26 which is driven to the right and left side in the drawing by means of the pressure oil which is supplied and discharged to a hydraulic piston device 27 from the pressure oil source 23 through pipings 25b and 25c by controlling the electromagnetic flow valve 19, electromagnetic pressure valve 20 and switch valve 21 with the controller 22. In other words, forward and backward movement of the screw 18 with respect to the nozzle part 12 for measuring of the plasticized synthetic resin to be injected and injecting and filling of the measured plasticized synthetic resin into the cavity 17 of the mold 10, and the application of a predetermined pushing force to the screw 18 for providing a predetermined pressure of the plasticized synthetic resin in the cylinder 13 are carried out through the base 26 by supplying and exhausting pressure oil to the hydraulic piston device 27. A screw position detector 28 which detects positional values of the screw 18 is disposed on the base 26. The detected positional values are transmitted to the controller 22 and an arithmetical unit 29 for determining the weight value of filled plasticized synthetic resin and the like. To the arithmetical unit 29 are also transmitted the temperature values from a resin temperature detector 30 which detects the temperature of the plasticized synthetic resin placed in the cylinder 13, the resin pressure values from a resin pressure detector 31 which detects the resin pressure of the plasticized synthetic resin placed in the cylinder 13 and the cavity resin pressure values from a cavity pressure detector 32 which detects the resin pressure of the plasticized synthetic resin placed in the cavity 17 of the mold 10

In the flow passage 15 of the nozzle part 12 is provided a closing valve 33 which constitutes the flow passage 15 opening and closing mechanism of the present invention and blocks the flow of the melted plasticized synthetic resin. Opening and closing of the closing valve 33 is accomplished through the lever 35 by controlling an electromagnetic drive device 34.

Figure 2:
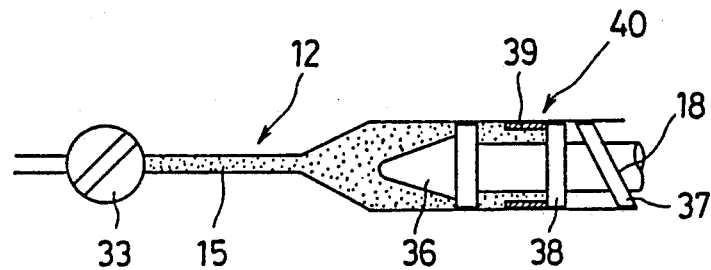

As shown in FIG. 2, a ring-like shaped slidable valve member 39 which is axially movable forward and backward is inserted between a conical front end 36 of the screw 18 and a flange projection 38 at the end of spiral 37. The ring-like shaped slidable valve member 39 is pressed and contacted to the flange projection 38 when the pressure of the plasticized synthetic resin at the leftside of the drawing, in turn, at the front end side of the screw 18 becomes higher, so that it prevents the plasticized synthetic resin from flowing back to the right side in the drawing. Thus, a check valve 40 consists of the flange projection 38 and ring-like shaped slidable valve member 39.

Figure 4:
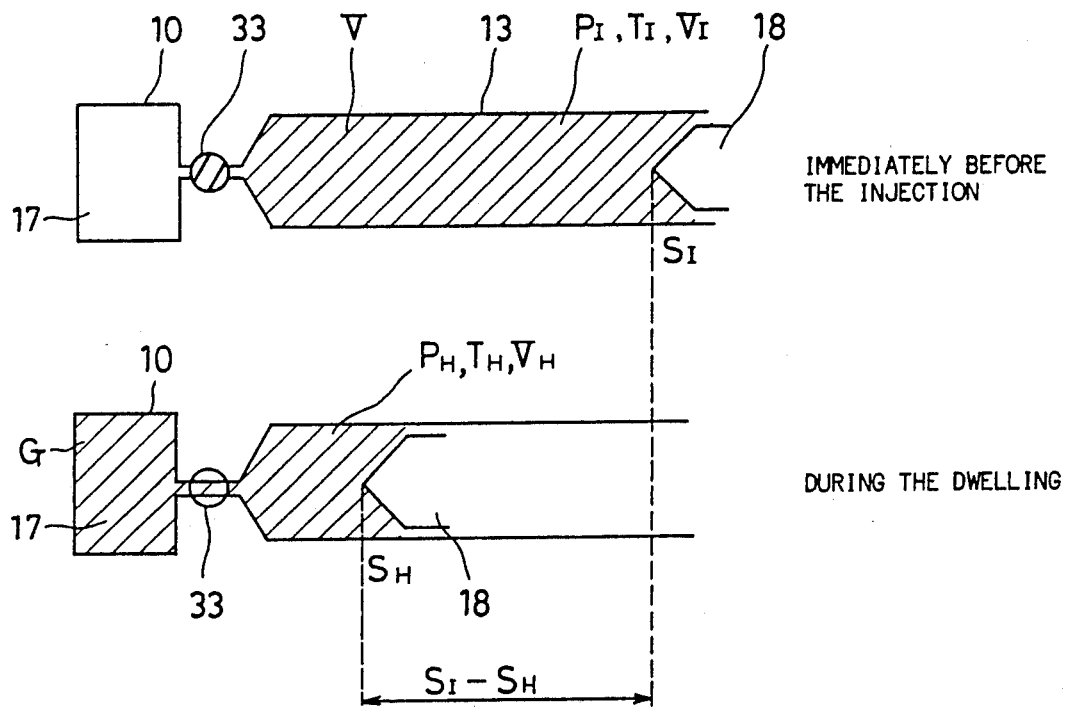
Figure 3:
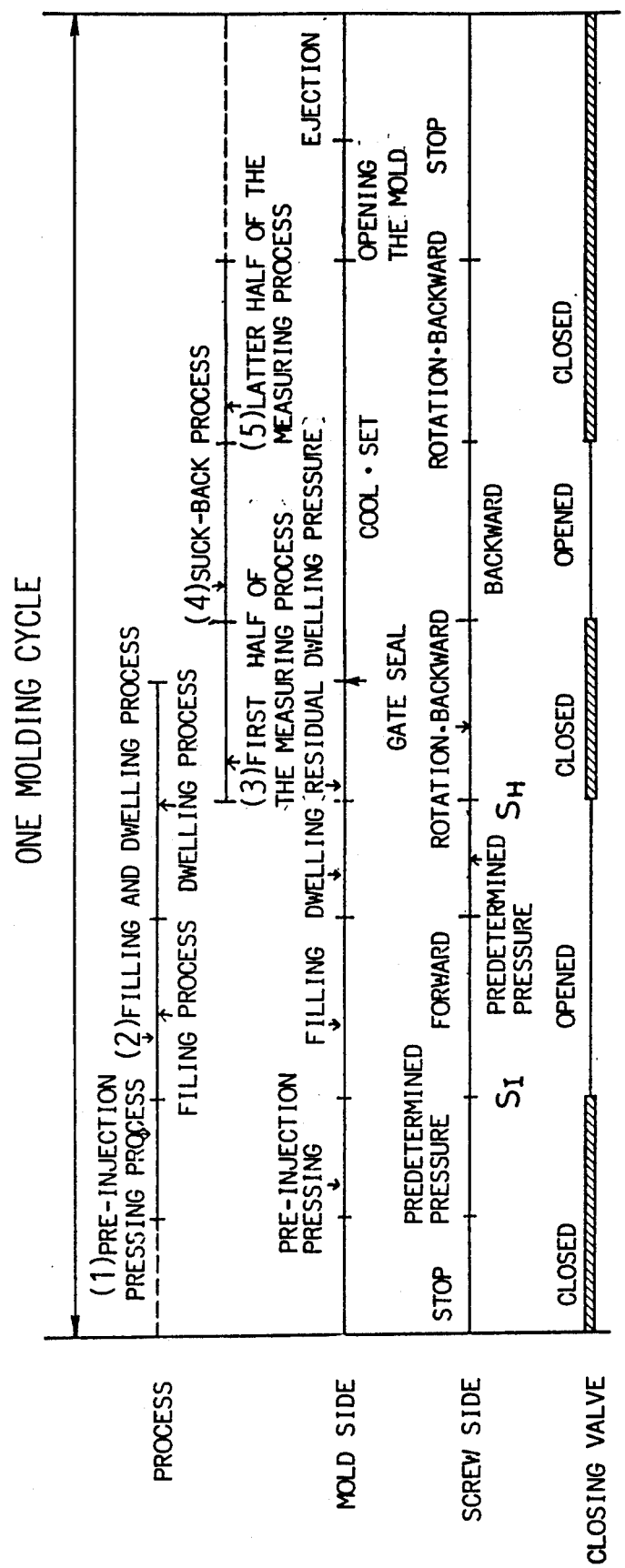

Next, an embodiment of a molding cycle control method of an injection molder according to the present invention using the above-mentioned injection molder will be explained referring to FIGS. 3 and 4.

(1) Pre-injection Pressing Process

After the synthetic resin is plasticized and measured, and while the closing valve 33 is closed and the flow of the plasticized synthetic resin is blocked, a predetermined pushing force is applied to the screw 18. Hence, the check valve 40 is closed by the pushing force applied to the screw 18, so that the plasticized synthetic resin is blocked from flowing in the direction of moving back of the screw 18, thereby the allowing the pressure of the synthetic resin in the cylinder 13 to be at a definite predetermined resin pressure value $P_I$ which is detected by the resin pressure detector 31 and transmitted to the arithmetical unit 29. Also, a screw positional value $S_I$ at the time detecting $P_I$ is detected by the screw position detector 28 and transmitted to the controller 22 and the arithmetical unit 29, and the temperature values $T_I$ of the plasticized synthetic resin detected by the resin temperature detector 30 and is the transmitted to the arithmetical unit 29. Specific values of the resin pressure value $P_I$, screw positional value $S_I$ and temperature value $T_I$ are supplied, as detected values obtained immediately before the injection operation, to the arithmetical unit 29 for its determination of a weight value G (described later) of the plasticized synthetic resin to be filled in the cavity 17. (See FIG. 4)

(2) Filling and Dwelling Process

While the closing valve 33 is open and the plasticized synthetic resin can flow, the screw 18 is moved forward to fill the plasticized synthetic resin into the cavity 17 of the mold 10 followed by applying a predetermined pushing force to the screw 18 to give a dwelling pressure to the plasticized synthetic resin filled in the cavity 17. While a predetermined pushing force is applied to the screw 18, the closing valve 33 is closed to allow resin pressure the cylinder 13 to be at a definite predetermined resin pressure value $P_H$ which is detected by the resin pressure detector 31 and transmitted to the arithmetical unit 29. Also, while the closing valve 33 is closed, the screw positional value $S_H$ detected by the screw position detector 28 is transmitted to the controller 22 and the arithmetical unit 29, and the temperature value $T_H$ of the plasticized synthetic resin detected by the resin temperature detector 30 is transmitted to the arithmetical unit 29. Specific values of the resin pressure value $P_H$, screw positional value $S_H$ and temperature value $T_H$ are supplied, as detected values obtained in the dwelling operation, to the arithmetical unit 29 in order to be applied in the determination of a weight value G (described later) of the plasticized synthetic resin to be filled in the cavity 17. (See FIG. 4)

(3) The First Half of the Measuring Process

While the closing valve 33 is closed, as continued from the previous process, to block the plasticized synthetic resin from flowing, the screw 18 is rotated and moved back to measure a predetermined ratio of the plasticized synthetic resin of a predetermined amount of the same for a next molding cycle. In the previous process (2) of the filling and dwelling process, the closing valve 33, was closed while a predetermined pushing force was being applied to the screw 18, so that the plasticized synthetic resin remaining in the cavity 17 has residual dwelling pressure even after the closing valve 33 is closed, which is the same as that applied by the screw 18 due to the predetermined pushing force to give dwelling pressure to the plasticized synthetic resin. Hence, the present first half of the measuring process carries out the dwelling operation through residual dwelling pressure, on the mold 10 side of the valve 33 simultaneously with the measuring operation on the screw 18 side of the valve 33.

(4) Suck-back Process

Which the plasticized synthetic resin in the gate 16 of the mold 10 is set (gate-sealed), the closing valve 33 is opened and due to the screw 18 moving back, the pressure of plasticized synthetic resin between the gate 16 of mold 10 and the front end of the screw 18 at its forward movement side is lowered, so that leakage of the plasticized synthetic resin placed between the nozzle part 12 and the mold 10 or from the parting line thereof is prevented.

(5) The Latter Half of the Measuring Process

While the closing valve 33 is closed to block the plasticized synthetic resin from flowing, the screw 18 is rotated and moved back to measure a remaining portion of the plasticized synthetic resin in addition to that measured in the previous (3) measuring process to reach the predetermined amount of plasticized synthetic resin for a next molding cycle.

In a series of molding processes above, the closing valve 33 is closed while a predetermined pushing force is applied to the screw 18 in the dwelling process, so that movement of the screw 18 does not affect the mold 10 side. Hence, the mold 10 side has a residual dwelling pressure with the dwelling operation being continued, and the screw 18 side is able to carry out measuring for a next molding cycle immediately after the closing of the closing valve 33. Thus, the dwelling process and the measuring process run simultaneously, thereby shortening the time required for each molding cycle.

Both the closing valve 33 and the check valve 40 are closed immediately before the injection (immediately after pre-injection pressing) and during dwelling operation. Resin pressure of the plasticized synthetic resin placed between the closing valve 33 and the check valve 40 with the screw 18 being so positioned in these circumstances indicates definite predetermined values. Thus, in the arithmetical unit 29, specific volume value of the plasticized synthetic resin is obtained from a known resin properties relation formula, such as PVT relation formula (resin pressure value—resin specific volume value—resin temperature values) by the use of the above values of the screw positional values $S_I$, $S_H$, resin pressure values $P_I$, $P_H$ and resin temperature values $T_I$, $T_H$, and further, the weight value G of plasticized synthetic resin to be filled in the cavity 17 is obtained through an operation based on the following formula (1).

$$G = (1/V_I - 1V_H) \times V + A \times X/V_H \quad (1)$$

wherein:
- $V_I$: is a specific volume value of plasticized synthetic resin on the forward movement side of the front end of the screw 18 in the cylinder 13 immediately before the injection operation;
- $V_H$: is a specific volume value of the plasticized synthetic resin on the forward movement side of the front end of the screw 18 in the cylinder 13 during the dwelling operation;
- V: is a volume value of the plasticized synthetic resin placed on the forward movement side of the front end of the screw 18 in the cylinder 13 immediately before the injection (i.e., the internal volume value of the cylinder);
- A: is the internal sectional area of the cylinder;
- X: is the travel distance of the screw 18 from its position immediately before the injection to its position during the dwelling operation (i.e., $S_I - S_H$).

The internal sectional area A of the cylinder in the formula (1) is obtained from the design value of the injection molder 11, and the volume value V of the plasticized synthetic resin placed the front end of the screw 18 on the forward movement side in the cylinder 13 immediately before the injection can be obtained from the cylinder internal sectional area A and the screw positional value $S_I$ through the operation by the arithmetical unit 29.

Even when a molding condition changes from a standard condition due to external disturbances and the like, molded products of a stable quality can be provided by controlling the injection molder on the basis of a traveling distance X of the screw 18 which value is obtained through the operation of using the PVT relation formula (1) to form a molded product with a target weight value G.

In the present embodiment, the weight value G of plasticized synthetic resin to be filled in the cavity 17 of the mold 10 is obtained through the operation. And, furthermore, the injection molder may be controlled by detecting the screw positional values, the resin pressure value of plasticized synthetic resin placed in the cylinder 13 or in the cavity 17, corresponding to the weight value G, respectively. When there is a stable molding condition substantially without a change of the molding condition, or there is almost no change in the resin pressure values $P_I$, $P_H$, and the resin temperature value $T_I$, $T_H$, it is enough, for directly obtaining the weight value G, to detect that the screw 18 is moved for a predetermined distance from a point where it is positioned immediately before the injection.

The nearer the screw 18 is positioned to the nozzle part 12 in the suck-back process, the more effectively the pressure of the plasticized synthetic resin can be lowered. In the present embodiment, the measuring process is divided into two with respect to the time when the gate 16 is sealed, so that the first half of the measuring process includes the suck-back process. Alternatively, the suck-back process may be conducted after the completion of the measuring process depending on the kinds of the plasticized synthetic resin to be used, resin pressure values, shapes of the mold 10, volumes of the cavity 17 and the like.

INDUSTRIAL AVAILABILITY

According to the present invention, the dwelling process and the measuring of the plasticized synthetic resin for a next molding cycle are carried out simultaneously, so that the time required for each molding cycle can be shortened. Also, even when the molding condition changes due to the external disturbances or the like, the weight values of molded products can be kept constant, thereby contributing to the improvement of the productivity and the quality of products.

What is claimed is:

1. A molding cycle control method for an injection molder comprising a cylinder with a screw therein and a flow passage opening and closing mechanism which is provided between the cylinder of the injection molder and a gate of a mold, the mold having a mold cavity, the opening and closing mechanism provided for the flow of a plasticized synthetic resin between the inside of the cylinder and the cavity of the mold, the method comprising the following steps:
   (a) a pre-injection pressing process wherein after the synthetic resin is plasticized and measured, with the flow passage opening and closing mechanism closed to prevent the flow of the plasticized synthetic resin, a predetermined pushing force is applied to the screw to set the resin pressure value inside the cylinder equal to a predetermined value,
   (b) a filling and dwelling process comprising a filling process wherein with the flow passage opening and closing mechanism open to allow the plasticized synthetic resin to flow, the screw is moved forward to inject and fill the plasticized synthetic resin into the cavity of the mold, and a dwelling process to apply a predetermined pushing force to the screw following the filling process, during which the flow passage opening and closing mechanism is closed the filling and dwelling process being conducted to fill a predetermined amount of the plasticized synthetic resin into the cavity,
   (c) a measuring process wherein with the flow passage opening and closing mechanism closed to block the flow of plasticized synthetic resin, the screw is rotated and moved backward to measure a predetermined amount of the plasticized synthetic resin for a next molding cycle, and
   (d) a suck-back process wherein with the flow passage opening and closing mechanism open to allow the plasticized synthetic resin to flow, the screw is moved backward to lower the pressure of the plasticized synthetic resin located between the gate of the mold and the front end of the screw at its forward movement side.

2. The molding cycle control method of an injection molder as set forth in claim 1, wherein in the pre-injection pressing process, a check valve mounted to the screw is closed to prevent a flow of the plasticized synthetic resin placed between the flow passage opening and closing mechanism and the check valve toward the direction of backward movement of the screw.

3. The molding cycle control method of an injection molder as set forth in claims 1 or 2, wherein during the dwelling and filling process, a predetermined amount of the plasticized synthetic resin to be filled in the cavity is determined based on the positional value of the screw or pressure values of the plasticized synthetic resin placed in the cylinder or in the cavity.

4. The molding cycle control method of an injection molder as set forth in claims 1 or 2, wherein during the dwelling and filling process, a predetermined amount of the plasticized synthetic resin to be filled in the cavity is determined on the basis of a predetermined travel distance of the screw from the position where the screw is positioned immediately before the injection.

5. The molding cycle control method of an injection molder as set forth in claims 1 or 2, wherein a predetermined amount of the plasticized synthetic resin to be filled in the cavity during the dwelling and filling process is represented by the following formula with a weight value G:

$$G = (1V_I - 1/V_H) \times V + A \times X/V_H$$

wherein:
V$_I$ is a specific volume value of plasticized synthetic resin placed at its forward movement side of the front end of the screw in the cylinder immediately before the injection operation;
V$_H$ is a specific volume value of the plasticized synthetic resin placed at its forward movement side of the front end of the screw in the cylinder during the dwelling process;
V is a volume of the plastifiable synthetic resin placed at its forward movement side of the front end of the screw in the cylinder immediately before the injection operation;
A is an internal sectional area of the cylinder; and,
X is a travel distance of the screw from immediately before the injection to the dwelling operation.

6. The molding cycle control method of an injection molder as set forth in claim 1, wherein the suck-back process is carried out with the plasticized synthetic resin placed in the gate of the mold solidified and blocked from flowing in the gate.

7. The molding cycle control method of an injection molder as set forth in claim 1, wherein the suck-back process is conducted during the measuring process.

8. The molding cycle control method of an injection molder as set forth in claim 1, wherein after the completion of the measuring process, the flow passage opening and closing mechanism is open and the suck-back process is carried out.

9. A control method for an injection molder comprising a cylinder having a screw therein and a flow passage opening and closing mechanism between the cylinder and a gate of a mold having mold cavity to selectively block the flow of resin between the cylinder and the mold, the method comprising:
a filling step comprising advancing the screw in the cylinder with the flow passage opening and closing mechanism open to inject resin from the cylinder into the mold cavity;
a dwelling step comprising applying a predetermined pressure to the resin injected into the cavity of the mold with the screw;
a measuring step comprising closing the flow passage opening and closing mechanism while the predetermined pressure is being applied, and retracting the screw to measure a predetermined amount of resin in the cylinder for the next molding cycle while the flow passage opening and closing mechanism remains closed;
a suckback step occurring after the resin has solidified in the gate of the mold comprising opening the flow passage opening and closing mechanism and retracting the screw to reduce the pressure on the resin between the front of the screw and the gate.

10. The method according to claim 9 wherein the measuring step comprises a first measuring step in which the a first predetermined amount of resin is measured in the cylinder before the suckback step, and a second measuring step in which an additional amount of resin is measured in the cylinder after the suckback step and prior to the next molding cycle.

* * * * *